April 23, 1957  H. D. WINTER ET AL  2,789,444
DOUBLE CLUTCH DRIVE MECHANISM
Filed Oct. 30, 1953
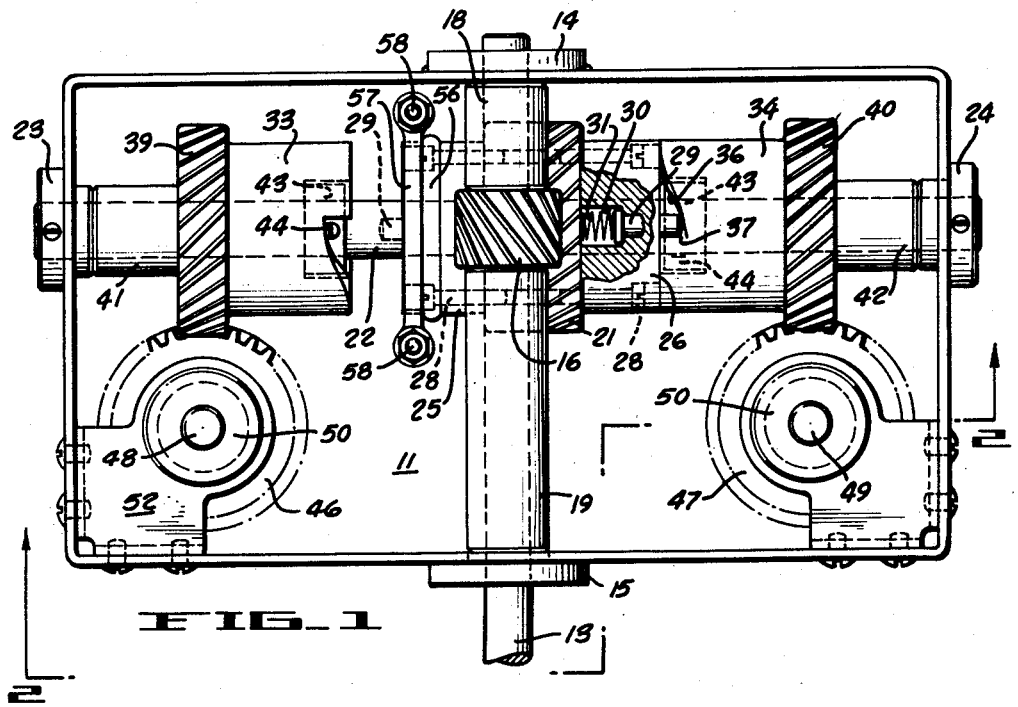
FIG_1
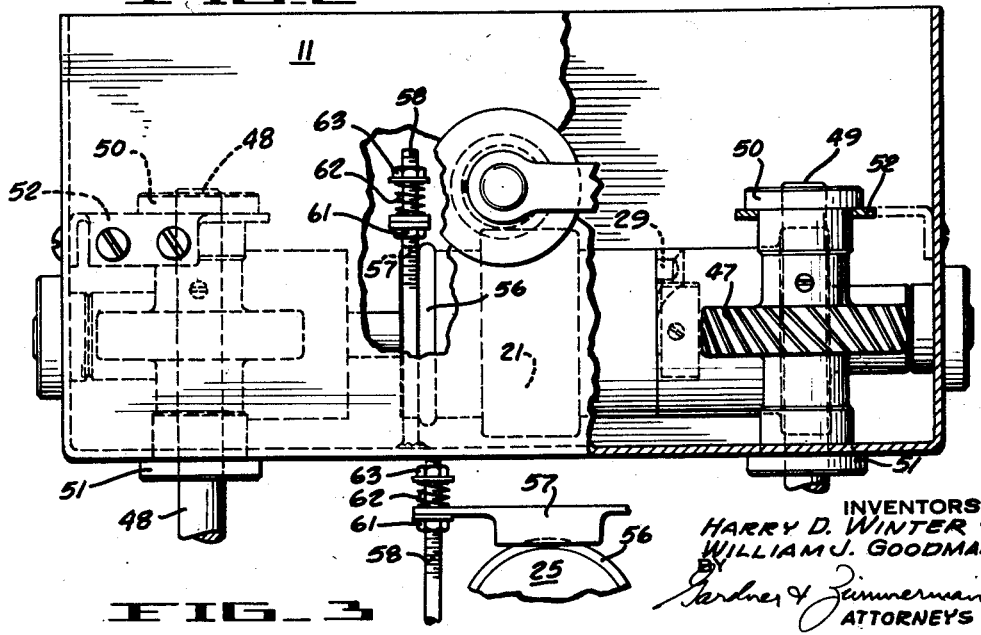
FIG_2
FIG_3
INVENTORS
HARRY D. WINTER &
WILLIAM J. GOODMAN
BY Gardner & Zimmerman
ATTORNEYS

United States Patent Office 2,789,444
Patented Apr. 23, 1957

2,789,444

DOUBLE CLUTCH DRIVE MECHANISM

Harry D. Winter, Albany, and William J. Goodman, Oakland, Calif.

Application October 30, 1953, Serial No. 389,361

4 Claims. (Cl. 74—665)

The present invention relates to a double clutch drive mechanism, and in more particular to a positive double clutch with means for automatically engaging one of the clutches while disengaging the other when the rotation of a drive to said clutches is reversed.

There have been other clutches of this nature but they have been complicated by cams and auxiliary mechanisms needed to obtain a shifting of the clutches upon a reversal of the drive.

Thus it is an object of the present invention to provide a double clutch that will operate upon a drive reversal without the use of auxiliary mechanisms.

A further object of the present invention is the devising of such a clutch that will operate in any position.

The invention possesses other objects and features of advantage, some of which with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

The above defects of the prior art are remedied and these objects achieved by using a pair of connecting helical gears and the axial thrust of the driven gear, which reverses its direction upon reversal of the direction of rotation of the drive gear, to shift the clutches. The positive shifting of the clutches, no matter what the inclination of the clutches, is achieved by providing a friction drag upon the rotation of the driven gear only when both clutches are disengaged which forces engagement of the proper clutch as required by the direction of rotation.

A construction embodying the above outline is described in detail hereinafter and shown in the accompanying drawings, in which:

Figure 1 is a plan view of a gear box having gears and a pair of positive clutches embodying the present invention, with certain parts broken away and the box cover removed.

Figure 2 is an elevational view of Figure 1 with parts of the gear box removed.

Figure 3 is a detail view of a portion of the shift drag mechanism.

There is no side thrust developed when one plain spur gear drives another. However, when the teeth of a pair of spur gears are given a helical form, there is side thrust developed whether the shafts are parallel or at an angle to each other in parallel planes. The sense of the direction of this side thrust depends upon the direction sense of rotation of the gear being considered, and is opposite for a drive and a driven gear. The sense of the side thrust is reversed when the rotation of a helical gear is reversed. This side thrust, hereinafter called "thrust," and its change in sense upon rotation reversal is used in the present invention to obtain clutch shift.

A particular embodiment of this principle is shown in the drawings in which a gear box 11 acts as a housing and bearings support for the necessary shafts and gearing. A reversible motor or other suitable drive, not shown, is secured outboard of a drive shaft 13 that extends across the box 11, is located midway of the ends thereof, is provided with a bearing 14, 15 in each box side wall, has secured thereto a helical drive gear 16, or pinion, and is held from axial movement by sleeves 18, 19 arranged coaxial of the shaft. A helical driven gear 21 having a wide face is arranged below and in mesh with the drive pinion 16, and is journaled on a driven gear shaft 22 that is at right angles to the drive shaft 13. The driven shaft is supported at each end in the box ends, and axial movement thereof is prevented by a collar 23, 24 secured to the shaft contiguous to each box end exterior. This driven shaft may or may not rotate as such is immaterial.

Also carried on the driven gear shaft are two clutches. For the purpose of terminology, one is called a left and the other a right clutch, because as shown in the drawings one is at the left of the box and the other at the right of the box. The two clutches are identical but reversed end for end as arranged on the driven shaft 22. The input control end 25, 26 of each clutch is journaled on the driven shaft 22, and one is secured to each side of the driven gear 21 by screws 28. Each clutch drive end carries one or more drive headed-pins 29 which is arranged parallel to the driven shaft in a varying cross-section hole 30 in the drive end, and is urged axially away from the driven gear 21 by a spring 31 bearing between the pin's head and the adjacent side of the driven gear. The output ends 33, 34 of the two clutches are journaled on the driven shaft 22, and spaced apart with the driven gear 21 and the two input ends 25, 26 therebetween. Each output end is provided with a recess in its face opposed to and in line with the drive pin 29 of its input end, which recess has an inclined side 36 which terminates at an abrupt side 37 or shoulder. It will be observed that, although the clutches are identical, when changed end for end, the abrupt sides 37 of the two clutch output end's recesses are opposed so that when a drive pin 29 is in one of these recesses and driving against the shoulder 37, the directional sense of rotation of one clutch is opposite what it would be for the other if its drive pin were in its shoulder.

The spring 31 behind each drive pin 29 allows the input sides of the clutches to shift against the output sides even if the pins are not aligned with their recesses. This spring, also, reduces shock and wear on its pin. If retracted, the pins erupt when aligned with their recesses.

A jack helical-pinion 39, 40 is secured to each clutch output end, coaxial therewith, and journaled on the driven shaft 22. A spacing sleeve 41, 42 between each jack gear and the adjacent box end prevents the output ends 33, 34 and jack gears from separating farther than desired. An annular groove 43 is formed in the mating face of each output end, and in each groove a pin 44 is inserted through the driven shaft 22 to prevent the output ends moving toward each other. Thus the output ends are secured against axial shift, and the space therebetween is sufficient to hold the driven gear 21 and the two clutch input ends 25, 26, with room enough to allow the gear and its attached ends to be axially shifted so that neither clutch is in engagement. This allows one clutch to be completely disengaged before the other engages. The face of the driven helical gear 21 is wide enough so that as the gear shifts from side to side to engage one clutch and disengage the other, the gear remains in engagement with its drive gear 16.

Each jack pinion 39, 40 is in engagement with a separate jack gear 46, 47 secured to its output or jack shaft 48, 49 which is journaled in bearings 50, 51, one secured in a bracket 52 fastened in a corner of the box and the other secured in the bottom of the box, with a portion of the shaft outboard of the box bottom for connection to any desired receiver of power from this gearing. The jack shaft bearings and the gear hubs align the jack gear with its pinion. While the present showing gives the jack shafts opposite rotations with respect to each other, it is obvious that they could rotate in the same direction by changing the helix of the jack gears teeth of one set from a sinistral to a dextral form, or by placing one of the driven jack gears on the other side of its pinion.

Ordinarily, the rotational resistance of the shiftable unit, the driven gear 21 and the input ends 25, 26 on their shaft 22, is great enough to give an axial component of the rotational force greater than the force required to shift the unit along its shaft, and so the unit shifts whenever its sense of rotation is changed. However, in order to make sure that this shiftable unit does not take up a neutral position where neither clutch is engaged, and to make sure that the unit will shift even if the driven shaft is inclined to the horizontal, there is provided a drag on the unit which comes into action only when the unit is in neutral. This drag mechanism is constructed by providing one of the input ends such as the left one 25, with a narrow annular rib 56 located centrally of the face of the end. A friction block 57 about the width of the rib 56 is placed so that it will contact the rib only when the input end is in neutral position, and will not contact the rib when the unit has been shifted into engagement with either clutch output. The drag upon the unit, caused by contact of the block 57 with the rib 56, increases the side thrust sufficiently to force the unit to shift under all conditions. The block 57 is held in place by two bolts 58 each passing loosely through an end of the block with the bolt heads welded to the bottom of the box. On each bolt 58, a nut 61 limits movement of the block 57 toward the clutch input end 25 so that the block does not contact any part of the input end except the rib 56. A spring 62 around each bolt is compressed between the block 57 and another nut 63 threaded on each bolt 58, urges the block downward for contact with the rib 56.

The double clutch construction of the present device is simple and automatic in its operation. No cams or other auxiliary mechanisms are required to obtain a shifting of the clutches. The shift is automatic when the drive is reversed. The output of a clutch is activated whenever the drive is reversed.

Having thus described our invention, we claim:

1. A drive mechanism, comprising: a pair of rotatable axially supportable connecting helical gears, one being a drive and the other a driven gear, said gears having axes of rotation disposed substantially at right angles to each other, said driven gear developing an axial thrust in one direction or the other depending upon the direction of rotation of the gears and their construction as helical gears, said driven gear being axially shiftable, means for rotatably and axially supporting said gears, a clutch engaging control including a spring loaded pin secured to said driven gear and shiftable axially therewith to effect a clutch engaging movement in one direction of shift and a clutch disengaging movement in the opposite direction of shift, whereby the axial thrust of the driven gear developed upon rotation of said gears in one direction will cause said driven gear and clutch control to shift to effect a clutch engaging movement and whereby the axial thrust of the driven gear developed upon rotation of said gears in the other direction will cause said driven gear and clutch control to shift to effect a clutch disengaging movement.

2. A drive mechanism, comprising: a pair of rotatable axially supportable connecting helical gears, one being a drive gear and the other a driven gear, said driven gear developing an axial thrust in one direction or the other depending upon its direction of rotation by said drive gear and the construction of said gears as helical gears; a drive gear axial support means; a pair of positive clutches in opposed relation, each having an input control end including a spring-loaded pin and an output end including a recess having an inclined side and a shoulder for receiving said pin, said ends being axially supportable and shiftable for engagement and disengagement relative to each other whereby the directional sense of rotation of said clutches are opposite to each other; and means including a shaft spacing apart said output ends a fixed distance, axially supporting said driven gear and said clutches with said driven gear between said control ends and said control ends between said output ends, and allowing axial shifting movement of said driven gear and said input control ends without disengagement of said gears, said control ends being secured to said driven gear; whereby the axial thrust of the driven gear developed upon rotation of said driven gear by said drive gear in either direction will cause said driven gear and clutch control ends to shift to effect clutch engaging and disengaging movements and effect contra rotation of said shaft depending on the clutch being engaged.

3. A drive mechanism, comprising: a pair of rotatable axially supportable connecting helical gears, one being a drive gear and the other a driven gear, said driven gear developing an axial thrust in one direction or the other depending upon its direction of rotation by said drive gear and the construction of said gears as helical gears; a drive gear axial support means; a pair of positive clutches, each having an input control end and an output end, said ends being axially supportable and shiftable for engagement and disengagement relative to each other; means including a shaft spacing apart said output ends a fixed distance, axially supporting said driven gear and said clutches with said driven gear between said control ends and said control ends between said output ends, and allowing axial shifting movement of said driven gear and said input control ends without disengagement of said gears, said control ends being secured to said driven gear; whereby the axial thrust of the driven gear developed upon rotation of said driven gear by said drive gear in either direction will cause said driven gear and clutch control ends to shift to effect clutch engaging and disengaging movements; and an output shaft driven by each of said clutch output ends in opposite directions of rotation.

4. Apparatus as set forth in claim 3 including drag means operatively connected with one of said clutches whereby said driven gear is forced towards one of said clutch engaging positions.

References Cited in the file of this patent

UNITED STATES PATENTS

| | | |
|---|---|---|
| 991,521 | Maize | May 9, 1911 |
| 1,441,528 | Reid et al. | Jan. 9, 1923 |
| 2,505,841 | Shuker | May 2, 1950 |